United States Patent [19]

Pirone

[11] Patent Number: 4,638,139
[45] Date of Patent: Jan. 20, 1987

[54] ELECTRICAL DISCHARGE MACHINE COOLING FLUID CONTAINMENT APPARATUS

[75] Inventor: Vincent A. Pirone, Lawrenceville, N.J.

[73] Assignee: RCA Corporation, Princeton, N.J.

[21] Appl. No.: 653,049

[22] Filed: Sep. 21, 1984

[51] Int. Cl.[4] .......................... B23H 7/02; B23H 1/10
[52] U.S. Cl. ................................. 219/69 W; 204/206; 204/224 M; 219/69 D
[58] Field of Search .............. 219/69 D, 69 W, 69 M; 83/651.1; 204/206, 224 M

[56] References Cited

U.S. PATENT DOCUMENTS

| | | | |
|---|---|---|---|
| 2,906,853 | 9/1959 | Sibley | 219/69 W |
| 3,035,150 | 5/1962 | Connoy | 219/69 W |
| 3,487,189 | 12/1969 | Moore | 219/69 W |
| 3,928,163 | 12/1975 | Ullmann et al. | 204/206 |
| 3,943,322 | 3/1976 | Lehmann et al. | 219/69 W |
| 4,159,407 | 6/1979 | Wilkinson et al. | 219/69 M |
| 4,263,493 | 4/1981 | Kilcher | 219/69 W |
| 4,333,806 | 6/1982 | Inoue | 219/69 W |
| 4,414,456 | 11/1983 | Inoue | 219/69 D |
| 4,459,454 | 7/1984 | Inoue | 219/69 W |
| 4,495,393 | 1/1985 | Janicke | 219/69 W |
| 4,508,950 | 4/1985 | Inoue | 219/69 M |
| 4,527,035 | 7/1985 | Majestic | 219/69 D |

FOREIGN PATENT DOCUMENTS 57-1624  1/1982  Japan .............................. 219/69 D

OTHER PUBLICATIONS

Charmilles Andrew Training Manual, pp. 5-24.

Primary Examiner—A. D. Pellinen
Assistant Examiner—Geoffrey S. Evans
Attorney, Agent, or Firm—Joseph S. Tripoli; William Squire

[57] ABSTRACT

A stream confinement apparatus which contains an EDM cooling stream in the work zone region includes a grooved element which is releasably clamped to the workpiece. The groove and workpiece form a fluid conduit which confines the stream of coolant to the work zone engulfing the EDM electrode minimizing electrode failure due to electrode overheating.

11 Claims, 4 Drawing Figures

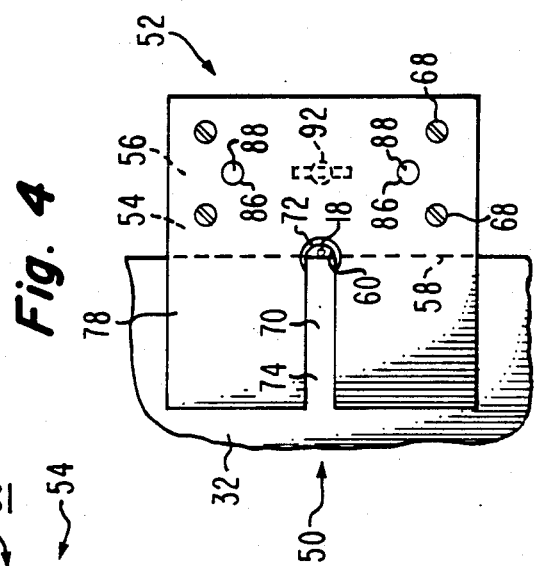
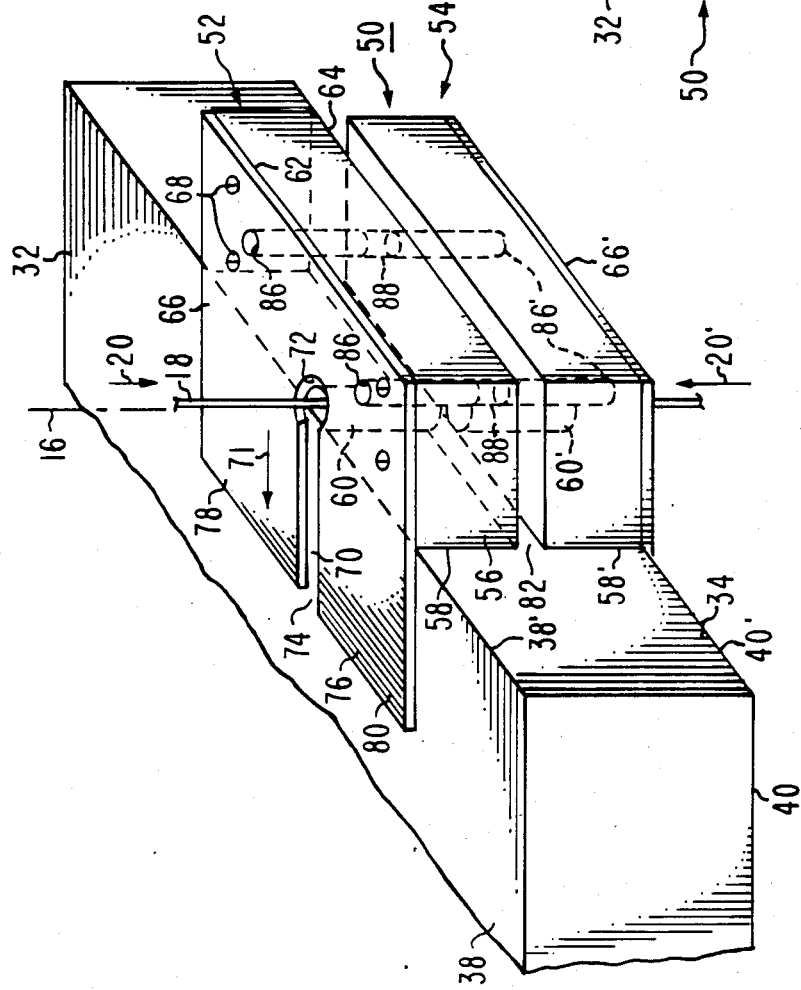

ELECTRICAL DISCHARGE MACHINE COOLING FLUID CONTAINMENT APPARATUS

This invention relates to an apparatus and method for cooling the work zone of an electrical discharge machine (EDM) with a stream of cooling fluid.

In one kind of EDM system a filamentary electrode is employed for spark erosion of a workpiece. The filamentary electrode may be a small diameter wire which is continuously moved adjacent to the workpiece during the eroding operation. For example, the wire electrode may be supplied from a reel on one portion of the EDM to a take-up reel on another portion of the EDM. The wire moves in a linear path adjacent to the workpiece in the work zone to continuously provide a refreshed section of the wire for spark eroding the workpiece.

Because of the high temperatures created by the spark erosion, the close proximity of the electrode to the workpiece and the small transverse diameter of the electrode, jet-like streams of a cooling medium such as water are supplied over the wire at the work zone to prevent overheating and breakage of the electrode. The cooling water streams are supplied from nozzles above and below the workpiece and are intended to be directed along the length of the wire parallel to the wire path at the work zone. In one implementation the cooling streams can be supplied in a range of different velocities corresponding to the range of power levels at which the EDM is operated. That is, at higher power levels, the work zone has higher tempertures. Thus, the machine can provide additional cooling fluid by manually increasing the cooling stream velocities accordingly.

A problem unique to this kind of EDM in certain machining environments is that the electrode frequently breaks during the initial start-up interval. The cooling streams are diverted from the electrode as the electrode approaches the workpiece surface. The reason for this diversion, which is not easily observed because of the flood of cooling fluid at the work zone, is that as an edge of the workpiece is moved adjacent the electrode, when the breakage problem is observed to occur most frequently, the cooling streams are believed to be diverted from their intended paths by various surfaces of the workpiece. That is, when the streams impinge on the edge surfaces they splatter, splash, and are diverted somewhat from the work zone. This diversion is believed to cause the electrode to receive insufficient cooling fluid, overheat and break.

One solution to this kind of problem suggested by one EDM manufacturer is to initially process the workpiece at a lower power level and at reduced cooling stream velocities to minimize their diversion by the splashing effect. This lower starting power makes it more difficult to initially erode the workpiece. To increase the spark erosion efficiency, the power level is increased after the electrode enters the internal region of the workpiece, the diversion of the higher velocity streams being believed to be no longer a significant problem at that location.

Such a shift in power level during the processing of the workpiece by an EDM slows the process, is cumbersome and is not always effective in precluding failure of the wire electrode. Further, some workpiece materials are not relatively adaptable to initial low power spark erosion.

An apparatus and method according to the present invention controls a cooling fluid stream applied parallel to an electrical discharge machine wire electrode dispensed adjacent to a workpiece surface to be processed thereby. The stream tends to be diverted from the wire electrode upon impingement on an edge of the workpiece at its surface. The apparatus and method includes containing the fluid stream to preclude the diversion so that the strea surrounds the wire throughout the region adjacent the workpiece surface.

In the drawing:

FIG. 3 is an isometric view of a portion of the workpiece and cooling fluid containment apparatus of FIG. 2; and FIG. 4 is a plan view of the cooling fluid containment apparatus of FIGS. 2 and 3.

Figure 1:
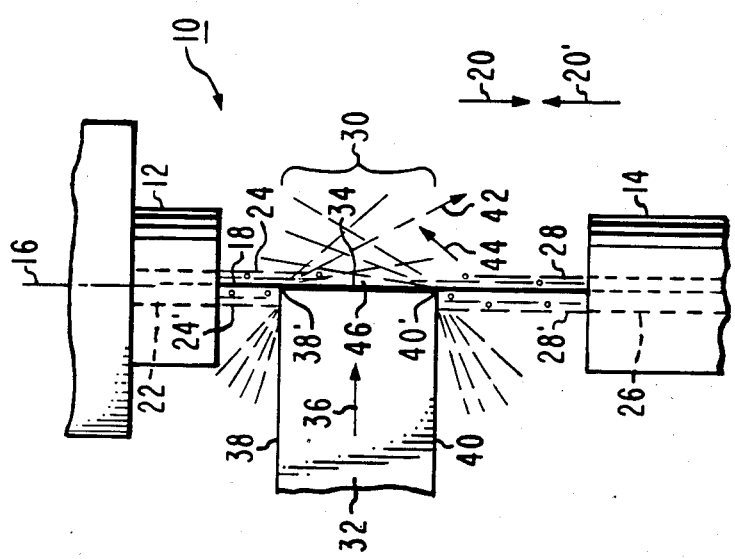
FIG. 1 is a partially schematic side elevation view of a portion of a prior art EDM apparatus for purpose of illustrating the nature of the problem solved by the present invention.

In FIG. 1, EDM apparatus 10 includes a pair of operating heads 12 and 14 aligned along axis 16 in spaced, opposed relationship. The apparatus 10 includes reels (not shown) for dispensing and receiving a relatively small diameter wire electrode 18 in direction 20 parallel to axis 16. Head 12 includes a nozzle 22 which dispenses a jet-like stream 24 of cooling water. The stream 24 is directed parallel to the axis 16, direction 20, and is intended to surround and flood the electrode 18 in the work zone 30 region adjacent head 12. A second nozzle 26 located in head 14 supplies a second jet-like stream 28 of cooling water in direction 20' opposite direction 20. Stream 28 is aligned with the stream 24 on axis 16 to flood the electrode 18 in the work zone 30 region adjacent head 14. It is intended that the two streams 24 and 28 impinge somewhat central of the region 30 and flood the entire work zone of the electrode 18.

Streams 24 and 28 are supplied from a source of water via pumps or other means (not shown) under pressure via controls (not shown) included with apparatus 10. The streams 24 and 28 each have a velocity which can be set proportional to the level of the electrical power supplied to electrode 18. As the power level supplied to electrode 18 is increased, the corresponding velocities of the streams 24 and 28 are usually increased accordingly. The higher power levels on the electrode 18 increases the operating temperature of the spark erosion function of the electrode 18 and therefore requires additional cooling fluid.

The electrode 18 is a small diameter filament, or example, 0.010 inch diameter, made or brass and therefore is temperature sensitive. Without the cooling streams 24 and 28, the higher temperatures tend to break the electrode. It is to be understood that the electrode 18 is continually under tension, under internal stress during operation, and therefore such higher temperatures tend to weaken the electrode.

In FIG. 1, workpiece 32 is supported by a structure (not shown) included with the apparatus 10 and may be a block of metal which has a surface 34 parallel to axis 16 and electrode 18. The surface 34 is initially processed by electrode 18 which spark erodes a slit in the workpiece 32 having a transverse width slightly larger than the electrode diameter. The workpiece 32 is moved in direction 36 or other directions normal to axis 16 toward electrode 18 during the spark erosion process.

However, the present inventor has observed, when the workpiece edge surface 34 is placed contiguous with the electrode 18 to start the spark erosion process, a portion 24' of stream 24 and a portion 28' of the stream 28 impinge opposite workpiece surfaces 38 and 40, respectively, adjacent to workpiece surface 34. The portions 24' and 28' of the respective streams also impinge the corners 38' and 40' at which the respective surfaces 38 and 40 intersect with the workpiece surface 34. Impingement of the streams on the corners 38' and 40' is believed to divert the streams 24 and 28 from the central region of the work zone 30 in respective directions 42 and 44.

The resultant diversion of the streams 24 and 28 in respective directions 42 and 44 creates a central region 46 adjacent the workpiece surface 34 in which there is an absence of cooling fluid. The electrode 18 passes through the region 46 and receives minimal or no cooling fluid in this region. Because of lack of cooling fluid, the electrode 18 in region 46 tends to overheat and break, requiring additional cumbersome start-up sequences including rethreading of the electrode 18.

Figure 2:
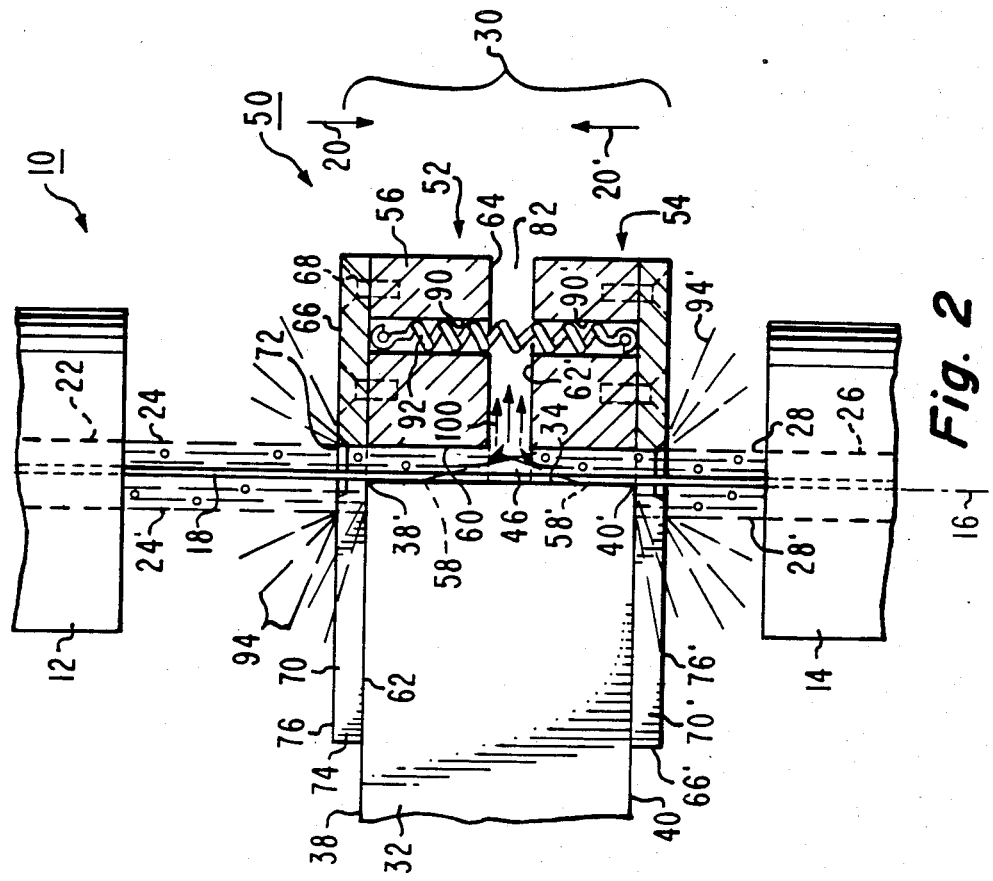
FIG. 2 is a partially schematic side, sectional view of an apparatus in accordance with one embodiment of the invention.

In FIG. 2, cooling fluid containment apparatus 50 is attached to the workpiece 32 of the apparatus of FIG. 1 for confining the streams 24 and 28 to the region 46. Apparatus 50 abuts workpiece 32 surface 34 and comprises a pair of sections 52 and 54 of like construction. Section 52 is a mirror image of section 54 and its description is representative of section 54. The primed reference numerals of section 54 refer to identical elements on section 52. Section 52 comprises a clamping sheet-like member 66 and a fluid stream containment block 56 which when joined are L-shaped and abut respective surfaces 38 and 34 of workpiece 32.

The width of block 56 in direction 20 is less than half the width of the workpiece 32 in the same direction so that the two sections 52 and 54 are spaced by gap 82. Block 56 has a groove 60 in communication with the block 56 surface 58. Groove 60 extends the width of block 56 from surface 62 to surface 64, FIG. 2. Surface 58 of block 56 abuts workpiece surface 34 such that groove 60 with surface 34 forms an annular conduit which surrounds wire 18 passing therethrough. Groove 60' of block 58' is aligned with groove 60 on axis 16 to form two spaced aligned conduits around wire 18. The midsection of the work zone 30, FIG. 2, at gap 82 is open to the ambient environment.

Member 66, which is formed of sheet material, is fastened to block 56 by screws 68. Member 66 has a slot 70 forming a pair of spaced clamp ears 76 and 78, FIG. 3, which abut workpiece 32 surface 38. Ears 76' and 78' of member 66' abut surface 40 at a location spaced from and aligned with ears 76 and 78, respectively, FIG. 3, In a direction parallel to axis 16. The slot 70 is aligned with slot 70' of member 66', direction 20, so that the electrode 18 passes through both slots as it processes the workpiece 32 in direction 71. The slot 70 is straight in this embodiment, but may be curved or have any shape depending upon the pattern of the erosion. Slot 70 is open at end 74 to permit insertion of the apparatus 50 over electrode 18, direction 71, after workpiece 32 is in place. The groove 60 at block 56 surface 62 is aligned with slot 70 at end 72 to form a continuous groove therewith on axis 16.

Section 52 includes a pair of spaced guide apertures 86 parallel to axis 16. A guide pin 88 is located in each of the guide apertures 86 and 86' of sections 52 and 54, respectively, for permitting relative adjustable slidable guiding of the sections 52 and 54 in directions 20 and 20'. The semicircular end 72 of slot 70 is chamfered to facilitate flowing the corresponding stream 24, FIG. 2, into the conduit formed by groove 60 and surface 34.

In FIG. 2, block 56 includes an aperture 90 parallel to groove 60 and in which is secured one end of tension spring 92. The other end of tension spring 92 is secured in like aperture 90' of section 54. Spring 92 pulls sections 52 and 54 together in corresponding directions 20 and 20'.

In operation, the two sections 52 and 54 are assembled to the workpiece 32 by separating the spacing between members 66, 66' and slipping the ears 76, 76' and 78, 78' of the two sections over the respective surfaces 38 and 40 of workpiece 32. Spring 92 urges the members 66 and 66', and thus sections 52 and 54, toward each other, resiliently clamping the workpiece 32 therebetween. This resilient clamping of the two sections permits the apparatus 50 to be connected to workpieces of different thicknesses.

The apparatus 50 is assembled to the workpiece 32 with the surfaces 58 and 58' of the respective sections 52 and 54 abutting workpiece surface 34. The channels 60 and 60' are aligned in the axial direction 20 and with surface 34 surround the electrode 18. Section 54 is adjacent to and faces stream 28, FIG. 2, and section 52 is adjacent to and faces stream 24.

In FIG. 2, when the stream 24 impinges upon the outer surface of member 66, a portion 94 of the stream 24 tends to scatter. However, a portion of the stream 24 enters the conduit between groove 60 and surface 34, is prevented from diverting, and is directed into a continuous flowing stream engulfing the electrode 18 at region 46. Similarly, the stream 28 splatters somewhat at portion 94', but a portion of stream 28 flows into the conduit formed by the corresponding groove 60' and workpiece surface 34 adjacent to section 54. This portion engulfs the electrode 18 at work region 46. The two streams abut midsection of the workpiece 32 and tend to flow at 100 in the mid work zone region between the two sections into the ambient environment. An important consideration is that the work zone region 46 midway between the surfaces 38, 40 of workpiece 32 is flooded by the streams 24 and 28 providing cooling fluid thereto regardless the relatively high stream velocities precluding diversion of the streams from the work zone as occurred previously.

While in the present embodiment two sections 52 and 54 are illustrated, it is apparent that a single section such as section 52 extending for the full width of a workpiece such as workpiece 32 may be resiliently attached to a relatively thin member, such as member 66', attached to the opposite surface 40 of the workpiece. This single section may be provided with a chamber equivalent to the gap 82 between the two sections 52 and 54 for providing exit flow of the two streams from the mid region of the conduit formed by such a single section.

In an embodiment of an EDM in which a single stream such as stream 24 is provided and stream 28 is omitted, then it is apparent that a single section such as section 52 may be provided for the full thickness of the workpiece with a gap such as gap 82 located at a point opposite the point of ingress of that stream. The sections 52 and 54 while shown made of solid material may be made of perforated material if the streams are substantially confined to the area surrounding the electrode 18 in the work region 46 to prevent diversion of the streams. In other words, the important parameter of the two sections at the work zone adjacent the central region of the workpiece is to prevent diversion of the streams and not so much as the particular construction of the confining or containing apparatus.

What is claimed is:

1. Apparatus for controlling a cooling fluid stream applied parallel to an electrical discharge machine wire electrode dispensed adjacent an exterior surface of an electrically conductive workpiece to be processed thereby, said stream being directed toward said workpiece and tending to splash and be diverted from said wire electrode in a region adjacent said surface upon impingement on an edge of said workpiece at said surface, said apparatus comprising:

channel means adapted to abut an exterior surface of a workpiece for containing the fluid stream to reduce splashing and diversion so that at least a portion of the stream surrounds the wire throughout a region adjacent the surface of the workpiece; and clamp means attached to said channel means to releasably secure said channel means to said workpiece surface, whereby said clamp means is carried by said workpiece.

2. A cooling fluid containment apparatus for an electrical discharge machine of the type including a moving electrode wire for removing material from an exterior surface of an electrical conductive workpiece adjacent a work portion of the wire, said workpiece surface tending to have different length dimensions on different workpieces, said machine further including a cooling fluid dispensing nozzle adjacent said work portion for directing a stream of said fluid parallel to said wire and exterior surface and along the length of said work portion, said workpiece surface having an edge tending to divert and splash said stream from the work portion at a region adjacent said workpiece surface and thereby permit said work portion to overheat and break, said apparatus comprising:

a member having a channel in communication with a surface therof, said channel being dimensioned to pass a wire and at least a portion of a stream of cooling fluid therethrough; and clamp means for releasably attaching said channel adjacent to and facing a workpiece surface along a length of said wire work portion to form a stream containment conduit with said workpiece surface, said conduit substantially surrounding a wire work portion at at least a portion of said workpiece surface adjacent an edge thereof for substantially reducing diversion of cooling fluid and pass said portion into a region adjacent the workpiece surface and thereby cool said wire at said region, said clamp means including means adapted to releasably clamp to and be carried by said workpiece at and regardless of said different length dimensions.

3. The apparatus of claim 2 wherein said member includes a clamping portion and a channel portion, said clamping portion including a pair of spaced resiliently coupled clamping jaws for resiliently clamping said workpiece therebetween.

4. The apparatus of claim 2 wherein said machine includes a pair of fluid dispensing nozzles in opposed spaced relation for directing a pair of aligned streams in opposite directions along said wire length, said apparatus further including a pair of said members, each corresponding to a respective, different stream, and means for adjustably coupling said members with their respective channels and workpiece region substantially surrounding said wire, said clamping means securing each member adjacent a corresponding nozzle for containing the stream of that nozzle.

5. A cooling fluid containment apparatus for forming a cooling fluid conduit with an exterior surface of an electrically conductive workpiece to be processed by a moving electrical discharge machine electrode wire, said machine including a cooling fluid nozzle for dispensing a stream of cooling fluid parallel to said wire, said fluid tending to splash and divert upon impingement on an edge of said workpiece at said surface, said apparatus comprising:

a channel member having a channel in communication with a workpiece engagement surface thereof, said channel extending from a first end surface of said member to a second end surface of said member, said channel being dimensioned to pass said wire and at least a portion of said stream therethrough; and clamp means attached to said channel member for releasably securing said channel member to said workpiece so the workpiece carries the clamp means and so the workpiece engagement surface is in abutting relationship with an exterior surface of said workpiece at said edge of said workpiece surface to thereby form said channel member and said workpiece exterior surface into an annular fluid conduit through which said dispensed wire and a cooling fluid portion passes to therby contain a portion of fluid diverted upon impingement of the surface of the workpiece.

6. The apparatus of claim 5 wherein said clamp means attached to said member includes a leg member extending from said channel member at one end thereof, said leg member including a slot in communication with said channel at one slot end, the other slot end terminating in communication with an edge of said leg member.

7. The apparatus of claim 6 wherein said clamp means attached to said member further includes means adapted to be coupled to the workpiece for resiliently clamping said leg member to said workpiece.

8. The apparatus of claim 5 further including an additional channel member, said channel members including alignment means coupled thereto for aligning the channels of each channel member on the same given axis and to face the same direction and for permitting the channel members to displace relative to each other in a direction parallel to said axis.

9. The apparatus of claim 8 wherein said means attached to said member include clamp means secured to each channel member for clamping said workpiece therebetween, said clamp means including spring means coupled thereto for resiliently urging said clamp means in a clamping direction parallel to said axis.

10. The apparatus of claim 9 wherein said clamp means includes first and second clamp members secured to a respective end of the corresponding channel member, each first and second clamp member having a given slot, the slots of each clamp member being aligned parallel normal to said axis and being in communication with the channel of the corresponding channel member.

11. A cooling fluid containment apparatus for forming a cooling fluid conduit with an exterior surface of an electrically conductive workpiece to be processed by a moving electrical discharge machine electrode wire, said machine including a cooling fluid nozzle for dispensing a stream of cooling fluid parallel to said wire, said fluid tending to splash and divert upon impingement on an edge of said workpiece at said surface, said apparatus comprising:
first and second channel members, each having a channel in communication with a workpiece engagement surface thereof, each said channel extending from a first member end surface to a second member end surface, said channels being dimensioned to pass said wire and at least a portion of a stream of cooling fluid therethrough; and
means attached to said first and second members for releasably securing said workpiece engagement surfaces in abutting relationship with a workpiece exterior surface at said edge of said workpiece surface to thereby form said first and second members and said workpiece surface into an annular fluid conduit through which a dispensed wire and a cooling fluid portion passes to thereby contain said portion of said diverted fluid, said channel members including alignment means coupled thereto for aligning the channels of each channel member on the same given axis and to face the same direction and for permitting the channel members to displace relative to each other in a direction parallel to said axis.

* * * * *